United States Patent Office 3,245,507
Patented Apr. 12, 1966

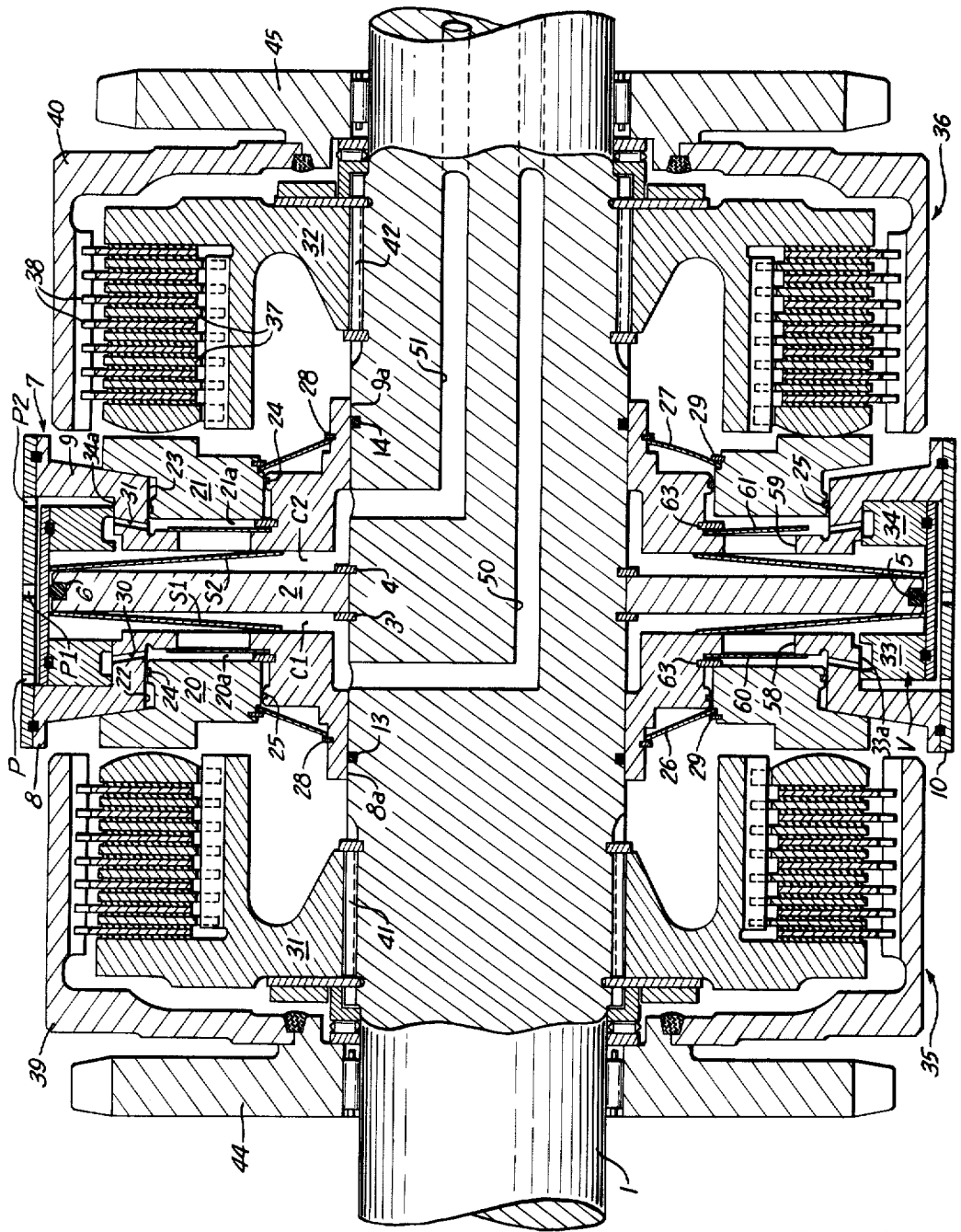

3,245,507
HYDRAULICALLY OPERATED DOUBLE CLUTCH DEVICE
Conrad R. Hilpert, Rockford, Ill., assignor to Twin Disc Clutch Company, Racine, Wis., a corporation of Wisconsin
Filed May 28, 1964, Ser. No. 370,787
7 Claims. (Cl. 192—87)

This invention relates generally to hydraulically operated clutch mechanisms of the type having a pair of opposed clutches coaxially mounted on a rotating shaft, wherein the clutches are selectively engaged to provide drive through associated gearing or the like.

Prior art devices of the above type use opposed clutch packs having interleaved clutch plates which are operable by a piston disposed between the clutch packs. That piston is hydraulically operated and requires complicated and expensive parts and valving arrangements to effect rapid clutch operation. In devices of the above type, two opposed piston actuating chambers are both maintained full of the hydraulic fluid at all times so as to insure immediate and rapid actuation of the mechanism selectively in either direction, and the fluid is transferred at a controlled rate from one chamber to the other in order to accomplish this instantaneous actuation.

In this manner, the oil volume requirement from the pressure supply system is held to a minimum in order to obtain this fast action, and as an example of this type of prior art device, reference may be had to U.S. Patent Number 3,106,999, issued October 15, 1963, entitled "Hydraulically Operated Clutch Mechanism," or U.S. Patent Number 2,920,732, issued January 12, 1960, entitled "Double Hydraulic Operated Clutch Device." In the device of either one of the said patents, the oil volume requirements for actuation are reduced, as previously mentioned, by providing for fluid transfer from the contracting chamber to the expanding or actuating chamber, and it is necessary to supply sufficient fluid immediately to move a large area piston, through its full stroke to effect clutch engagement.

While the above devices operate satisfactorily in most respects, they do have certain shortcomings, for example, they require rather complicated parts which are expensive to manufacture and the various elements of the fluid transfer valves are subject to malfunction due to foreign matter in the fluid, among other reasons. In addition, the initial and large clutch clamping force of the large area piston often result in an engagement which was not "soft" or smooth.

Accordingly, the present invention provides a hydraulic operated, double clutch of the opposed piston actuating chamber type, in which each clutch has a small volume primary piston that functions initially to take up the friction plate running clearance, and a large area piston which then provides the clamping force. The arrangement is such that the fluid volume requirements are determined by the small piston and the pressure requirements of the large piston are satisfied by very small fluid flow rates. The opposed actuating chambers are maintained full of fluid at all times from a fluid supply line, no fluid transfer from one large chamber to the other large chamber can occur or is necessary.

A more specific aspect of the invention provides that the small piston is actuated first to engage the clutch plates, and then the large piston moves to immediately cause valve means to form a substantially complete hydraulic lock between the small and large pistons, permitting them to function as a single unit in applying full force on the clutch pack. However, the hydraulic lock is not complete and a small amount of relative movement between the large and small pistons still occurs until the large piston bottoms against the small piston, providing a solid acting unit. The action is such that a cushioning effect is provided and a smooth and soft clutch engagement ensues.

Generally, the present invention provides a hydraulic dual clutch which is reliable, fast in operation, economical to manufacture, smooth in operation, and requires no transfer of fluid from one of the main actuating chambers to the other.

These and other objects and advantages of the present invention will appear herein as this disclosure progresses, reference being had to the accompanying drawing which is a longitudinal view, partially in section and with parts broken away or removed for clarity, of a clutch device embodying the present invention; the lower half of the drawing showing certain of the parts moved to a different position that shown in the upper half.

Referring in greater detail to the drawing, the clutch device is in the neutral or disengaged position in the upper half of the drawing, to which it is biased by the large Belleville springs S1 and S2. A shaft 1 which may be driven from a power source (not shown) has an annual reaction member 2 axially fixed thereon by snap rings 3 and 4 and rotatable with the shaft.

A sealing ring 5 is disposed in the groove 6 around the periphery of member 2 and sealingly engages the inner surface of an annular casing which forms a generally annular force piston 7. The reaction member divides the interior of the force piston into a pair of axially spaced fluid chambers C1 and C2.

The main piston

The main force piston 7 is of annular, hollow shape and has a pair of axially spaced end walls 8 and 9 which terminate respectively in central openings 8a and 9a. An outer sleeve 10 holds the end walls rigidly together, but the piston may be considered as a unitary construction. Piston 7 can reciprocate over the shaft and is in sealing relationship with it by conventional seals 13 and 14.

The primary pistons

A pair of primary or small pistons 20, 21 are axially slidable, in bores 22 and 23 of their respective end walls 8 and 9 of the main piston, and are in fluid sealing engagement therewith by means of the seals 24 and 25. Small fluid chambers 20a and 21a are thus formed by the small pistons and the main piston, and the pistons 20 and 21 and their associated parts are identical in construction, a description of one will be deemed to be sufficient.

The primary pistons 20 and 21 are resiliently retained in the large piston end walls by means of the conventional Belleville springs 26 and 27 held at their inner end by snap rings 28 and at their outer edges by snap rings 29. The small pistons 20, 21 have by-pass ports 30, 31, which may place the bores 22, 23 in communication with chambers C1, C2, respectively, depending on the position of the axially slidable valve V. Valve V comprises valve elements 33, 34 which are slidable in their respective bores 33a and 34a of the large piston walls 8 and 9. When valve V is in the piston shown in the upper portion of the drawing, element 33 has blocked port 30, while port 31 and its chamber 21a are open to chamber C2, thereby venting chamber 21a. The area radially outwardly of valve V is vented by ports P, P1 and P2.

Clutches

Clutches 35, 36 are located on opposite sides of the main force piston 7 and are similar to one another and conventional in nature, having interleaved friction discs 37, 38 splined, respectively, to their hubs 31, 32 and to their drums 39, 40. Hubs 31 and 32 are connected to shaft 1 by the spline connections 41 and 42 for rotation with the shaft. Drums 39 and 40 are rigidly secured to elements to be selectively driven, such as gears 44 and 45 which may be journalled on shaft 1 and connected with other elements to be driven.

*Fluid passages*

Hydraulic fluid is introduced into the various chambers in the following manner and the operation will be explained in connection with the right hand clutch, it being undesrtood that the operation of the other clutch is similar.

The large chambers C1 and C2 and small chambers 20a and 21a are kept filled with fluid and purged of air by selectively admitting pressure fluid from the passages 50, 51, respectively, in the shaft 1.

Also formed in the end walls 8 and 9 of the force piston area, are large fluid ports 58 and 59 which can place chambers C1 and C2, respectively into communication with their respective small chambers 20a and 21a. Fluid pushes one-way check valve plates 60, 61 off their holes 58, 59 and the fluid moves into the primary piston chambers. The valve plates 60 and 61 are of flat, ring-like construction and are held in relatively loosely assembled relationship on the main piston walls by means of the snap rings 63. These plates function as one-way valves and prevent flow from chambers 20a, 21a back to their respective large chambers C1 and C2.

With the above arrangement, both the small, primary piston chambers and the large piston chambers are maintained full of fluid from passages 50 and 51 because the fluid has no place to go.

*Operation*

The mechanism will be described when the right-hand clutch (as viewed in the drawing) is operated, it being understood that the operation of the left-hand clutch is similar.

The clutch mechanism as shown in the upper half of the drawing is in the neutral position.

Assume pressure fluid is applied via passage 51 to chamber C2, through port 59, past one-way valve 61 and into the small chamber 21a, thereby forcing small piston 21 against the clutch 36 and taking up clutch pack clearance. Chamber C2 of course also fills, but the small piston 21 moves before the main piston 7 moves to the right, as viewed in the drawing, because of the residual pressure in the left-hand chamber C1. Pressure fluid in the chamber C2 also shifts valve V to the right (as shown in the lower half of the drawing), blocking port 31 and venting port 30 and chamber 20a. When right-hand piston 21 stops (this is the position shown in the lower half of the drawing), pressure in the main chamber C2 rises. Fluid is locked in chamber 21a by the one-way plate valve 61 which has closed and valve element 34. At this time the main piston acts together (through the partial hydraulic lock in chamber 21a) with piston 21 to begin to apply clamping force on the clutch 36. Due to fluid leakage past seals 24 and 25 of chamber 21a, the hydraulic lock in chamber 21a decays and the main piston soon bears directly against the piston 21, and both pistons then act as a single unit in applying clamping force on clutch 36. Now the force developed in the chamber C2 is applied directly to the clutch pack, and while chamber C2 is being pressurized, chamber C1 is vented.

*Résumé*

With the clutch mechanism provided by the present invention, no transfer of oil between the main actuating chambers C1 and C2 is necessary, and a considerable number of complicated and expensive parts are not required as they were in certain of the prior art devices. Nevertheless, the volume of fluid required is held to a minimum and fast action is not sacrificed. This is accomplished by utilizing a small volume, primary piston to take up the friction plate running clearance, and a large area piston provide the clamping force. As a result, it is not necessary to supply sufficient fluid immediately to move the large area piston through its full stroke, but instead the fluid volume requirements are determined by the small piston and the pressure requirements of the large piston are satisfied by very small fluid flow rates.

The present clutch mechanism is fast in operation, more economical to manufacture and more reliable in operation, and also has smooth operating characteristics, which is due in great part to the hydraulic lock which is provided between the large and small pistons.

Various modes of carrying out the invention are contemplated as being within the scope of the following claims particularly pointing out and distinctly claiming the subject matter which is regarded as the invention:

I claim:

1. A hydraulically operated clutch mechanism comprising a pair of clutches having a common shaft; a main force piston shiftable on the outside of and surrounding said shaft between said clutches, an annular reaction member within and enclosed by said force piston and fixed on said shaft to define a pair of large, variable volume, pressure fluid chambers; a pair of primary pistons mounted on the outside of said main piston and one on each side of said main piston and slidably engageable therewith to define a pair of small variable volume chambers, each of said primary pistons being engageable with its respective clutch; fluid passage means in said main piston and in fluid delivering communication with said small chambers; and one-way check valve means between said small and large chamber to prevent return flow of said fluid from said small chamber to thereby provide a substantial hydraulic lock therein.

2. A hydraulically operated clutch mechanism comprising a pair of clutches having a common shaft; a main force piston shiftable on the shaft between said clutches; an annular reaction member within said force piston and fixed on said shaft to define a pair of large, variable volume, pressure fluid chambers; a pair of primary pistons mounted on the outside of said main piston and one on each side of said main piston and slidably engageable therewith to define a pair of small variable volume chambers, each of said primary pistons being engageable with its respective clutch; fluid passage means in said main piston and in fluid delivering communication with said small chambers; one-way check valve means between said small and large chamber to prevent return flow of said fluid from said small chamber to thereby provide a substantial hydraulic lock therein, and other valve means between each of said small chambers and its respective large chamber, said other valve means being shiftable by pressure fluid in the large chamber being pressurized whereby the small chamber adjacent thereto is closed and the opposite small chamber is vented.

3. A hydraulically operated clutch mechanism comprising a pair of clutches having a common shaft; a main force position shiftable on the outside of and surrounding said shaft between said clutches; an annular reaction member within and enclosed by said force piston and fixed on said shaft to define a pair of large, variable volume, pressure fluid chambers; a pair of primary pistons mounted on the outside of said main piston and one on each side of said main piston and slidably engageable therewith to define a pair of small variable volume chambers, each of said primary pistons being engageable with its respective clutch; passage means in said shaft for supplying pressure fluid selectively to said large chambers; second fluid passage in said main piston and placing each of said main chambers in fluid delivering communication with its respective small chamber; and one-way check valve means in said second fluid passage means to prevent return flow of said fluid from said smaller chamber.

4. A hydraulically operated clutch mechanism comprising a pair of clutches having a common shaft; a main force piston shiftable on the outside of and surrounding said shaft between said clutches; said main piston being hollow and of annular shape and having a pair of axially spaced end walls; an axially and outwardly extending bore in each of said end walls; an annular reaction member within and enclosed by said force piston and fixed on said shaft to define a pair of large, variable volume, pressure fluid chambers; a pair of primary pistons mounted on the outside of said main piston and one on each side of said main piston and slidable in its respective bore to define a pair of small variable volume chambers, each of said primary pistons being engageable with its respective clutch; fluid passage means in said end walls and in fluid delivering communication with said small chambers; and one-way check valve means in said passage means to prevent return flow of said fluid from said small chamber to thereby provide a substantial hydraulic lock therein.

5. A hydraulically operated clutch mechanism comprising a pair of clutches having a common shaft; a main force piston shiftable on the shaft between said clutches; said main piston being hollow and of annular shape and having a pair of axially spaced end walls; an axially and outwardly extending bore in each of said end walls; an annular reaction member within said force piston and fixed on said shaft to define a pair of large, variable volume, pressure fluid chambers; a pair of primary pistons mounted on the outside of said main piston and one on each side of said main piston and slidable in its respective bore to define a pair of small variable volume chambers, each of said primary pistons being engageable with its respective clutch; fluid passage means in said end walls and in fluid delivering communication with said small chambers; one-way check valve means in said passage means to prevent return flow of said fluid from said small chamber to thereby provide a substantial hydraulic lock therein, and other valve means between each of said small chambers and its respective large chamber, said other valve means being shiftable by pressure fluid in the large chamber being pressurized whereby the small chamber adjacent thereto is closed and the opposite small chamber is vented.

6. A hydraulically operated clutch mechanism comprising a pair of clutches having a common shaft; a main force piston shiftable on the outside of and surrounding said shaft between said clutches; an annular reaction member within and enclosed by said force piston and fixed on said shaft to define a pair of large, variable volume, pressure fluid chambers; a pair of primary pistons mounted on the outside of said main piston and one on each side of said main piston and slidably engageable therewith to define a pair of small variable volume chambers, each of said primary pistons being engageable with its respective clutch; fluid passage means in said main piston and in fluid delivering communication with said small chambers; one-way check valve means between said small and large chambers to prevent return flow of said fluid from said small chamber; and resilient means abutting against said main piston for biasing said main piston to a neutral position whereby pressure fluid moves one of said small pistons prior to movement of the large piston toward said small piston to thereby cooperate with said one-way check valve means to provide a substantial hydraulic lock in said small piston chamber.

7. A hydraulically operated clutch mechanism comprising a pair of clutches having a common shaft; a main force piston shiftable on the outside of and surrounding said shaft between said clutches; said main piston being hollow and of annular shape and having a pair of axially spaced end walls; an axially and outwardly extending bore in each of said end walls; an annular reaction member within and enclosed by said force piston and fixed on said shaft to define a pair of large, variable volume, pressure fluid chambers; a pair of primary pistons mounted on the outside of said main piston and one on each side of said main piston and slidable in its respective bore to define a pair of small variable volume chambers, each of said primary pistons being engageable with its respective clutch; passage means in said shaft for supplying pressure fluid selectively to said large chambers; second fluid passage means in said end walls and placing each of said main chambers in fluid delivering communication with its respective small chamber, and one-way check valve means in said second fluid passage means to prevent return flow of said fluid from said small chamber.

References Cited by the Examiner

UNITED STATES PATENTS

| 2,386,220 | 10/1945 | Lawler et al. | 192—85 X |
| 2,638,750 | 5/1953 | Hettinger | 188—196 |
| 3,032,157 | 5/1962 | Richards | 192—87 |

FOREIGN PATENTS 979,874  12/1950  France.

DAVID J. WILLIAMOWSKY, *Primary Examiner.*

DON A. WAITE, *Examiner.*

BENJAMIN W. WYCHE, *Assistant Examiner.*